United States Patent [19]

Elliott, Jr.

[11] 4,022,714

[45] *May 10, 1977

[54] SILICA HYDROSOL BOUND CRACKING CATALYSTS

[75] Inventor: Curtis Homer Elliott, Jr., Baltimore, Md.

[73] Assignee: W. R. Grace & Co., New York, N.Y.

[ * ] Notice: The portion of the term of this patent subsequent to Feb. 18, 1992, has been disclaimed.

[22] Filed: July 17, 1975

[21] Appl. No.: 596,922

[52] U.S. Cl. .............................. 252/455 Z; 252/432
[51] Int. Cl.$^2$ ...................... B01J 29/06; B01J 21/02
[58] Field of Search ................................. 252/455 Z

[56] References Cited

UNITED STATES PATENTS

| | | | |
|---|---|---|---|
| 3,459,679 | 8/1969 | Plank et al. | 252/455 Z |
| 3,471,410 | 10/1969 | Oleck et al. | 252/455 Z |
| 3,556,988 | 1/1971 | Stover et al. | 252/455 Z |
| 3,592,760 | 7/1971 | Young | 252/455 Z |
| 3,823,092 | 7/1974 | Gladrow et al. | 252/455 Z |
| 3,867,308 | 2/1975 | Elliott, Jr. | 252/455 Z |

OTHER PUBLICATIONS

B302,998, Jan. 1975, Young, 252/455 Z.

*Primary Examiner*—Carl F. Dees
*Attorney, Agent, or Firm*—Arthur P. Savage; Joseph P. Nigon; Kenneth E. Prince

[57] ABSTRACT

A process for modifying the silica hydrosol used to bind zeolite clay catalysts by adding salts of titania, zirconia, iron or ceria to the silica hydrosol in the course of preparation is disclosed. This addition alters the physical characteristics of catalyst when titania and zirconia salts are added and alters the matrix activity when quadrivalent cerium salts or iron salts are added to the silica hydrosol.

12 Claims, No Drawings

SILICA HYDROSOL BOUND CRACKING CATALYSTS

BACKGROUND OF THE INVENTION

The introduction of molecular sieve type cracking catalysts resulted in a dramatic improvement in cracking activity and selectivity of the catalyst. The molecular sieves are found to have intrinsic activity for cracking far greater than the conventional silica alumina cracking catalysts that were in use at the time of the introduction of the molecular sieve type catalyst.

There are several patents describing processes for preparing these zeolites. U.S. Pat. No. 3,692,655, for example, covers a method for preparing a faujasitic type zeolite that is stabilized by cation and thermal stabilization. The older more conventional cracking catalysts are described in Patents such as U.S. Pat. No. 3,404,097 to Wilson et al. which describes a silica-magnesia-fluoride catalyst. U.S. Pat. No. 3,650,988 of Magee et al. covers a process for preparing a hydrocarbon cracking catalyst containing a semi-synthetic portion, i.e., clay, silica-alumina and a zeolite portion. There are several other patents describing processes of preparing molecular sieve type catalyst. U.S. Pat. No. 3,425,956 of Baker et al. is typical of a large body of art in this area.

U.S. Pat. No. 3,867,308 to Elliott describes a process for preparing a hydrocarbon cracking catalyst by preparing a hydrosol by rapid addition to mineral acid to sodium silicate, adjusting the pH of the hydrosol, adding clay and zeolite components, spray drying, washing with water, rare earth exchanging and recovering the product.

In the process covered in the instant application the basic process is modified by the addition of titanium, zirconium, iron or quadrivalent cerium salts to the hydrosol to improve the qualities of the final product.

BRIEF DESCRIPTION OF THE INVENTION

I have found that the physical properties in some cases and the product distribution in others can be affected by the addition of certain inorganic materials to the silica hydrosol or in some other step in the process. In addition, certain of these additives alter the conditions of operation of the process and allow greater latitude in the operating conditions.

The other steps of the process are similar to the process disclosed previously. In a typical preparation the silica hydrosol contains about 5 to 15% silica. The inorganic oxide is equivalent to 0.1 to 10% of the $SiO_2$ in the hydrosol. The resulting mixture is mixed with clay and the zeolite and spray dried. The product after water washing may then be exchanged with rare earth or other salts to remove a large portion of the exchangeable sodium in the faujasite and is then washed, dried and the catalyst recovered.

DETAILED DESCRIPTION OF THE INVENTION

The first step in my novel process is the selection of the oxide to be added to the silica hydrosol. The preferred additives are titania, zirconia, iron oxide and ceria in the plus four state. Other additives such as boron oxide ($B_2O_3$) and a mixture of this oxide and alumina also give improved results. These oxides may be added to the silica hydrosol by adding soluble salts of these inorganic materials to the hydrosol during the pH adjustment with additional silicate. The additives may also be prepared as sols such as titanium sulfate, for example, and admixed with the silica hydrosol.

In addition the oxides of several inorganic elements that form alums may also be used. Typical examples of these alums include the alums having the emperical formula, $M_IM_{III}(SO_4)_2 \cdot 12H_2O$ where $M_I$ is sodium, potassium or ammonium and $M_{III}$ is manganese, cobalt, titanium, iridium and rhodium.

These alums can be conveniently added to the silica hydrosol in the hydrosol preparation step.

The oxides are normally added to the silica hydrosol in a quantity such that the oxide makes up from 0.1 to 10% of the oxide plus silica in the hydrosol with 0.5 to 3% being preferred. Small quantities, i.e. 0.1 to 5% of ammonia ($NH_4$) have also been shown to give good results.

The addition of titania or zirconia to the hydrosol has been shown to:

1. Produce a catalyst of higher initial surface area and larger water pore volume after steaming.
2. Permit the use of mixed silicates of different silica to sodium oxide ratios added in preparing the hydrosol without deleterious effect on the bulk density or attrition resistance of the final catalyst product.
3. Allow higher spray dryer operating temperatures.

The addition of iron oxide alone or in conjunction with titania results in a higher yield of the $C_5$ plus gasoline fraction and lower coke formation. This same result is also achieved by the addition of quadrivalent cerium salts to the hydrosol. The addition of boron oxide or a mixture of boron oxide and alumina has been shown to increase the fresh surface area of the catalyst.

In the next step of the process clay is added to the silica hydrosol containing the desired additive. The clay is present in an amount of about 10 to 65% by weight of the finished catalyst. Naturally occurring clays such as kaolin, halloysite, and montmorillonite may be used. Commercially available clay is described as having a particle size in the range of 60 to 80% less than 2 microns. Although naturally occurring clays are used to advantage in the preparation of this catalyst, it is contemplated that heat or chemically modified clays such as metakaolin or acid treated halloysite may also be used. The clay may be added to the silica hydrosol containing the inorganic oxide precursors or it may be added to the silicate prior to hydrosol formation. When the clay is added to the silica hydrosol it is added at a pH in the range of 3 to 8.0. The clay can be added dry or as a slurry in water.

The zeolite is added in the next step of the process. The preferred zeolite is the widely available zeolite known as faujasite. The zeolites publicized by Linde Division of Union Carbide Corporation as type X and type Y zeolites have the faujasite structure. These zeolites normally have a silica to alumina ratio of about 2.5 to 6.0, with those having a silica to alumina ratio of about 3.5 to 6 being the preferred faujasites. In addition to the faujasite, other widely known zeolitic materials resistant to acid conditions specific to this process can also be used. The zeolite is added in an amount of 5 to 60% of the final catalyst with 5 to 30% being preferred.

The addition of the oxide precursors does not appreciably effect the critically important pH control of the process. The pH control is important to prevent the tendency for the silica hydrosol to thicken and set to a gel. The faujasite is added to the silica hydrosol containing the additive precursor as a slurry adjusted to a pH of 3 to 5 without any danger of silica gel being precipitated on the interface of the particles of the faujasite. The pH of the faujasite slurry is adjusted by the addition of a dilute solution of a strong mineral acid. When the pH of the faujasite is adjusted between 3 and 5 the faujasite can be easily dispersed in the silica hydrosol containing the inorganic oxide precursors without particle encapsulation or gel lump formation.

The next step of the process is the spray drying. The spray dryer feed slurry containing silica hydrosol, the oxide precursor, clay and zeolite must have a pH between 2.8 and 3.5. It is important that the pH be maintained within this range since the destruction of the zeolite results if the pH of the feed slurry is below 2.8 and some difficulty with thickening of the slurry might result if the pH is above 3.5.

The slurry can be spray dried without difficulty. The spray driers normally operate at an outlet temperature of 250° to 500° F.

One of the important advantages of the overall process is found in the washing step. The spray dried catalyst can be washed with hot water. This is advantageous over the prior art methods of washing that required a wash with ammonium sulfate. In my process the sodium oxide that is not incorporated in the faujasite is in the form of sodium sulfate that is very soluble and easily removed by water wash.

The last step of the process is removal of a large portion of the exchangeable sodium in the faujasite by exchanging with a rare earth salt solution. This is normally accomplished using a commercially available rare earth chloride solution. The exchange is normally carried out with a solution containing 3 to 10% rare earth ($Re_2O_3$) at a temperature of 100° to 160° F. The exchange is effected by mixing the washed spray dried catalyst particles with a rare earth solution for a period of about 0.25 to 1 hour. The solution is separated from the catalyst particles and the particles are water washed and dried.

The catalyst is preferably dried at a temperature of about 250° to 450° F. to reduce the moisture content to below about 30 weight percent. The catalyst is then ready for use in a typical fluid cracking operation. It is contemplated that the catalyst may also be prepared in the form of bead type catalysts which are suitable for use in moving bed catalytic operations.

The catalyst typically prepared, according to the process of the present invention, has an alumina content of about 25 to 35%, a silica content of about 50 to 70% and an oxide additive content to about 0.1 to 2%, a rare earth content of about 2.5 to 5%. The $Na_2O$ content of the product is less than 1%, the sulfate content less than 0.5%.

A typical product had a water pore volume of 0.18 to 0.30 and a nitrogen pore volume of 0.10 to 0.10. The catalysts prepared by my process have an exceptionally high degree of attrition resistance. Typically these catalysts, when subjected to a standard attrition test, will be found to have attrition indices of 3 to 20. The Davison Attrition Index (D.I.) as referred to in the following examples is determined as follows:

A 7 g. sample is screened to remove particles in the 0 to 20 micron size range. The particles above 20 microns are then subjected to a 5 hour test in the standard Roller Particle Size Analyzer using a 0.07 inch jet and 1 inch I.D. U-Tube as supplied by American Instrument Company, Silver Spring, Maryland. An air flow of 21 liters per minute is used. The Davison Index is calculated as follows:

$$\text{Davison Index} = \frac{0 - 20 \text{ micron material formed during test}}{\text{Original 20 + micron fraction}} \times 100$$

Our novel catalyst was evaluated by comparing the activity of these catalysts with the activity of a standard catalyst containing rare earth faujasite. In this comparison both catalysts are subjected to the standard activity test described by Ciapetta and Henderson in the Oil and Gas Journal of Oct. 16, 1967 at pages 88 to 93. This procedure for comparing the activity of our catalyst with the standard catalyst was used to obtain the data set forth in the following examples.

Our invention is illustrated by the following specific but non-limiting examples.

EXAMPLE 1

A total of 2200 ml. of sulfuric acid was diluted with an equal volume of water and reacted with 52 lbs. of 16.5° Be sodium silicate solution to produce a dilute hydrosol having a pH of 0.4. Titanium sulfate (containing 0.1 pounds of $TiO_2$) in solution was added to the hydrosol giving a pH of 0.45. This silica hydrosol-titanium sulfate mixture was pumped to a high speed mixer where it was mixed with additional 16.5° Be sodium silicate solution having a $SiO_2$ to $Na_2O$ ratio of 3.36. The resulting hydrosol has a pH of 2.8. A total of 149 lbs. of silicate was added in the two steps to the mixture.

The catalyst slurry was prepared by mixing 37.6 lbs. of kaolin clay and a slurry of 29.7 lbs. of synthetic faujasite (containing 34% solids) in the sodium form with the hydrosol. The faujasite was fed in the form of an aqueous slurry that had been previously adjusted to a pH of 3.7 to 3.9 with dilute sulfuric acid. The pH of the catalyst feed slurry at this point was 2.98.

The catalyst feed slurry was then spray dried in a commercial drier operating at a gas inlet temperature of 600° F, and an outlet temperature of 350° F. The spray dried material was washed with hot water to remove the sodium sulfate, exchanged with the rare earth chloride solution, water washed and dried. The resulting catalyst had a bulk density of 0.7 and a Davison Attrition Index of 11.

EXAMPLE 2

A second titania containing catalyst slurry was prepared using the same quantities of reactants as in Example 1 except that the amount of titanium sulfate solution was increased to 3.3 lbs. (0.3 lbs. $TiO_2$) and the amount of silicate used to prepare the acid hydrosol totaled 148 lbs. As in Example 1, 37.5 lbs. kaolin clay was added along with an aqueous slurry of 29.7 lbs. of synthetic faujasite (containing 34% solids) in the sodium form which had been adjusted to a pH of 3.7 to 3.9 with dilute sulfuric acid. The resulting slurry was spray dried in a spray drier operated at an inlet temperature of 600° F. and an outlet temperature of 350° F. The spray dried material was washed with hot water to remove the sodium sulfate, exchanged with the rare earth chloride solution, water washed and dried. The resulting catalyst had a bulk density of 0.76 and a Davison Attrition Index of 13.

The activity of this catalyst and the catalyst of Example 1 was compared to the activity of a standard zeolite containing catalyst in the hydrogen form using the microactivity test discussed previously. The test was carried out at a temperature of 900° F. and a weight hourly space velocity of 2. The catalyst was subjected to steam at a temperature of 1070° F. and a pressure of 90 p.s.i.g. for 8 hours prior to the test. The data on the titania containing catalysts of Example 1 and Example 2 is set out in Table 1 below.

TABLE I

| Catalyst of | Example I | Example II |
|---|---|---|
| | Analysis in percent dry basis | |
| $Al_2O_3$ | 26.4 | 26.8 |
| $Re_2O_3$ | 3.62 | 3.41 |
| $Na_2O$ | 0.65 | 0.63 |
| $SO_4$ | 0.05 | 0.16 |
| $TiO_2$ | 1.28 | 1.39 |
| Surface area in m²/g. | 213 | 205 |
| Microactivity catalyst of these Examples (% conversion) | 92.9 | 85.2 |
| Standard catalyst (percent conversion) | 88.4 | 87.6 |

It is apparent from these data that the titania containing catalyst had surface areas of about 200 m²/g. This is substantially more than the surface area of the catalyst without titania addition which has a surface area of 140 m¹/g. The activity of the catalyst compared favorably with the activity of the catalyst used as a standard for comparison.

EXAMPLE 3

The catalysts were prepared using the general technique described above. An acid hydrosol containing the appropriate quantities of titania, zirconia, or combinations were prepared. The clay was added and mixed. Faujasitic zeolites in the sodium form were preacidified to a pH of 3.8 to 4.0 and added to the silica hydrosol-clay mix. The mixture was spray dried as in Examples 1 and 2, water washed and exchanged with a rare earth chloride solution, water washed and dried. The physical properties of the catalysts containing both titania and zirconia designated Catalyst A and a catalyst containing only zirconia designated Catalyst B are set out in Table 2 below.

Table II

| Catalyst | A | B |
|---|---|---|
| (1) $TiO_2$ in weight percent | 1.0 | 0 |
| (2) $ZrO_2$ in weight percent | 1.5 | 3.2 |
| Surface area in m²/g. | 216 | 178 |
| Average Bulk Density | 0.71 | 0.72 |
| Davison Index | 7 | 16 |

(1) Calculated as $\frac{TiO_2}{TiO_2 + ZrO_2 + SiO_2}$ in the hydrosol binder.

(2) Calculated as $\frac{ZrO_2}{TiO_2 + ZrO_2 + SiO_2}$ in the hydrosol binder.

It is apparent from these data that the catalyst containing a mixture of titania and zirconia had properties similar to the catalyst containing titania alone. The catalyst containing only zirconia had a slightly lower surface area.

EXAMPLE 4

A run was completed in which a catalyst was prepared that contained both titania and iron. The process used is essentially the same as the process described in Example 1. Sulfuric acid (2000 ml.) was diluted with 2200 ml. of water and reacted with 52 pounds of 16.5° Be sodium silicate to prepare an acid hydrosol having a pH of 1. Ferric chloride (390 g. $FeCl_3·6H_2O$) was dissolved in water and added to the acid hydrosol resulting in a hydrosol having a pH of 1.25. A titanium sulfate solution (750 grams) containing 68 g. of $TiO_2$ was then added to the hydrosol giving a hydrosol pH of 1.14. The final silica hydrosol was prepared by mixing the acid hydrosol containing titanium and iron salts with an additional 85 lbs. of 16.5° Be sodium silicate solution to a final hydrosol pH of 2.85.

The catalyst slurry was prepared by mixing the hydrosol with 37.6 lbs. of kaolin and a slurry containing 29.7 lbs. of synthetic faujasite (34% solids) in the sodium form that had been adjusted with dilute sulfuric acid to a pH of 3.9 to 4.0. The catalyst slurry was then spray dried in a commercial drier operated at a gas inlet temperature of 600° F. and a gas outlet temperature of 350° F. The spray dried material was washed with hot water to remove sodium sulfate exchanged with a rare earth chloride solution, water washed and dried. The properties of the catalyst are set out in Table III below.

TABLE III

| | Analysis in percent Dry Basis |
|---|---|
| $Al_2O_3$ | 28.2 |
| $Re_2O_3$ | 3.31 |
| $Fe_2O_3$ | 0.38 |
| $Na_2O$ | 0.61 |
| $SO_4$ | 0.05 |
| $TiO_2$ | 1.18 |
| Surface area | 209 |
| Bulk Density | 0.70 |
| Davison Index | 6 |
| Microactivity | |
| Catalyst of this Example (percent conversion) | 70 |
| Standard (percent conversion) | 67.8 |

It is apparent from these data that the surface area of the catalyst containing both titania and iron compared favorably with the surface area of the catalyst containing titania alone. The microactivity of the catalyst compared favorably with the microactivity of the standard used for comparison.

What is claimed is:

1. A process for preparing a hydrocarbon cracking catalyst which comprises:
   a. preparing a silica hydrosol by decreasing the pH of a sodium silicate solution to about 2.0 to 3.2,
   b. adding from about 0.1 to 10 percent based on the hydrosol silica content of a precursor of an oxide of titanium, zirconium, iron, boron or quadrivalent cerium and mixtures thereof thereto,
   c. adding clay before, during, or after hydrosol formation,
   d. preparing a water slurry of crystalline zeolitic aluminosilicate and adjusting the pH to about 3 to 4.5,
   e. mixing said zeolite slurry with the modified silica hydrosol clay slurry prepared in step (b) to prepare a spray drier feed slurry having a pH of 2.8 to 3.5,
   f. spray drying, before gellation occurs,
   g. washing, drying and recovering the product.

2. The process according to claim 1 wherein the oxide precursors are added as solutions of soluble salts.

3. The process according to claim 1 wherein the clay is added in an amount equal to about 10–65 percent of the finished catalyst.

4. The process according to claim 1 wherein the zeolitic aluminosilicate is added in an amount equal to about 4–60 percent of final catalyst.

5. The process according to claim 1 wherein the zeolitic aluminosilicate has a silica to alumina ratio of about 3.5 to 10.

6. The process according to claim 5 wherein the zeolite is faujasite having a silica to alumina ratio of 3.5 to 6.0.

7. The process according to claim 1 wherein the oxide is titanium dioxide.

8. The process according to claim 1 wherein the oxide is zirconium dioxide or a mixture of titanium and zirconium dioxides.

9. The process according to claim 1 wherein the oxide is iron oxide or a mixture of titanium and iron oxides.

10. The process according to claim 1 wherein the oxide is cerium dioxide or a mixture of titanium dioxide and cerium dioxide.

11. A process for preparing a petroleum cracking catalyst which comprises:
    a. preparing a silica hydrosol by rapidly adjusting the pH of a sodium silicate solution to a pH of 2.0 to 3.0 with a 20–65 percent solution of sulfuric acid,
    b. adding from about 0.1 to 10 percent, based on the hydrosol silica content of a precursor of an oxide of titanium, zirconium, iron, boron or quadrivalent cerium and mixtures thereof, thereto,
    c. adding clay before, during and after hydrosol formation,
    d. preparing an aqueous slurry of faujasite having a silica to alumina ratio of about 3.5 to 6.0 and adjusting the pH of said slurry to about 3.0 to 4.5 with dilute mineral acid,
    e. adding said slurry to the silica hydrosol-oxide-clay-slurry prepared in step (c) in an amount sufficient to provide about 15 to 25% faujasite in the final catalyst,
    f. spray drying the resulting slurry before gellation occurs and washing with water to decrease the sulfate content to less than 1%,
    g. exchanging the spray drier product with an ammonium or rare earth salt solution,
    h. washing, drying and recovering the product.

12. The process according to claim 11 wherein the spray drier product is exchanged with a rare earth solution to provide a rare earth content of about 2.5 to 5.0 weight percent in the final product.

* * * * *

UNITED STATES PATENT AND TRADEMARK OFFICE
CERTIFICATE OF CORRECTION

PATENT NO. : 4,022,714
DATED : May 10, 1977
INVENTOR(S) : Curtis Homer Elliott, Jr.

It is certified that error appears in the above-identified patent and that said Letters Patent are hereby corrected as shown below:

Column 6, line 68: delete [4-60] and insert --5-60-- therefore.

Signed and Sealed this twelfth Day of July 1977

[SEAL]

Attest:

RUTH C. MASON
*Attesting Officer*

C. MARSHALL DANN
*Commissioner of Patents and Trademarks*